United States Patent
Dedecker

(10) Patent No.: US 6,872,783 B2
(45) Date of Patent: Mar. 29, 2005

(54) METHOD OF PREPARATION OF COUPLED BRANCHED AND LINEAR POLYMER COMPOSITIONS

(75) Inventor: Mark N. Dedecker, North Canton, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 10/305,542

(22) Filed: Nov. 26, 2002

(65) Prior Publication Data

US 2003/0083446 A1 May 1, 2003

Related U.S. Application Data

(62) Division of application No. 09/533,746, filed on Mar. 23, 2000, now Pat. No. 6,525,140.

(51) Int. Cl.[7] .............................. C08L 9/00; C08L 47/00; C08F 8/42
(52) U.S. Cl. .................... 525/236; 525/332.3; 525/342; 525/370; 525/371; 526/173; 526/335
(58) Field of Search .............................. 525/236, 332.3, 525/342, 370, 371; 526/173, 335

(56) References Cited

U.S. PATENT DOCUMENTS

| | | | |
|---|---|---|---|
| 3,281,383 A | | 10/1966 | Zelinski et al. |
| 3,959,412 A | | 5/1976 | Oberlin |
| 4,004,070 A | | 1/1977 | Farrar |
| 4,130,606 A | | 12/1978 | Van Ballegooijen et al. |
| 4,182,814 A | * | 1/1980 | Bernemann et al. |
| 4,183,877 A | | 1/1980 | Ibaragi et al. |
| 4,340,691 A | | 7/1982 | Lal et al. |
| 4,562,172 A | | 12/1985 | Kang et al. |
| 4,845,165 A | * | 7/1989 | Halasa et al. |
| 5,362,817 A | | 11/1994 | Osman |
| 5,708,081 A | | 1/1998 | Sarraf et al. |
| 5,798,419 A | * | 8/1998 | Ruiz Santa Quiteria et al. |

FOREIGN PATENT DOCUMENTS

| | | |
|---|---|---|
| DE | 198 03 039 A1 | 7/1999 |
| EP | 0 019 100 A1 | 11/1980 |
| EP | 0 754 710 A2 | 1/1997 |
| EP | 0 903 373 A1 | 3/1999 |
| EP | 0 930 318 A1 | 7/1999 |
| JP | 62292844 | 10/1976 |
| WO | WO 99/09080 | 2/1999 |
| WO | WO 00/69927 | 11/2000 |

* cited by examiner

*Primary Examiner*—Caixia Lu
(74) *Attorney, Agent, or Firm*—Scott A. McCollister

(57) ABSTRACT

A continuous process for manufacture of a polymer including branched and linear components comprising first polymerizing conjugated diene(s) in the presence of an organometallic initiator to a conversion that is at least 90% complete. A coupling agent is added to obtain a polymer including branched and linear components. The coupling agent is added at a ratio of about 0.3 to about 0.6 coupling equivalents to initiator equivalents.

10 Claims, No Drawings

US 6,872,783 B2

METHOD OF PREPARATION OF COUPLED BRANCHED AND LINEAR POLYMER COMPOSITIONS

This application is a divisional of U.S. Ser. No. 09/533,746, filed Mar. 23, 2000, now U.S. Pat. No. 6,525,140.

BACKGROUND OF THE INVENTION

Polymers and copolymers of conjugated dienes such as polybutadiene, polyisoprene and styrene-butadiene rubbers possess physical properties which make them suitable for many important applications such as synthetic rubbers and as additives to other polymeric systems such as, for example, high impact polystyrene (HIPS). Moreover, HIPS can be manufactured by polymerization of styrene in the presence of 5–10% dissolved polybutadiene or butadiene copolymer rubber. Early in the polymerization, phase separation begins because of the immiscibility of the rubber within the polystyrene being formed and the depletion of the styrene phase. Grafting of polybutadiene with the polystyrene then takes place. Toughness, as well as other mechanical and rheological properties of HIPS, is strongly affected by the nature of the rubber phase. In this regard, some of the characteristics of the rubber which may be modified to control the overall HIPS performance include concentration, volume, particle size, grafting and cross-linking ability, molecular weight, and viscosity.

One focus of the present invention is use of polybutadiene as an additive in HIPS or ABS resins. Specifically, the present invention addresses the desire that the polybutadiene additive have useful molecular weight and viscosity ranges. In this regard, strictly linear polybutadiene of low molecular weight typically has a low Mooney viscosity, making the polybutadiene difficult to handle, while a tetra-coupled version of the same low molecular weight polymer is too high to be processed. One mechanism to achieve a desired molecular weight and viscosity is to use a blend of tetra-coupled and linear polymer chains.

One method for the manufacture of copolymers having linear and branched segments rubbery composition includes a blend of from 40–94 parts by weight (pbw) Component A and from 60–66 pbw of Component B. Component A includes a rubbery (co)polymer(s) of conjugated dienes, and at least 60% by weight of the components in the A portion are branched polymers. Component B is generally the same as Component A, but consists of linear (co)polymer(s). The process of manufacture involves forming Component A in a first step, Component B in a second step and performing a third step of blending A and B.

Another process is directed to polymerizing at least one diene monomer to a conversion between 30 and 70% to produce low molecular polydiene chains; joining from 20 to 70% of those chains with a suitable branching agent; and allowing the polymerization to continue to produce a polydiene rubber blend. However, by failing to perform sufficient conversion in the first step, insufficient solution viscosity is produced.

BRIEF SUMMARY OF THE INVENTION

In an exemplary embodiment of the invention, a continuous process for the manufacture of a polymer composition is disclosed. Particularly, the process is directed to the manufacture of a polymer including branched and linear segments by polymerizing diene monomers in the presence of an organolithium initiator of the general formula $MR_x$ to at least 90%, preferably 99% conversion, to produce polydiene chains. Thereafter, a coupling agent is added to obtain a polymer of mixed branched and linear polydiene units. The coupling agent is added at a ratio of about 0.3 to about 0.6 equivalents to organometallic initiator equivalents. The resulting polymer mixture has a solution viscosity in the range of about 150 to 190 cP (0.15 kg/m.s+0.19 kg/m.s) and a Mooney viscosity in the range of about 60 to 85 (ML4).

The process advantageously produces a mixture of linear and branched polymers, thereby gaining the benefits of the individual polymers without requiring separate production segments to make the individual products. Moreover, the process is performed continuously, not requiring separate polymerization stages and a subsequent blending of components. The present invention limits the coupled polymer percentage in the overall mixture to produce a high molecular weight fraction that would otherwise would be difficult to process by itself. The resultant polymer is particularly suited for use as an additive in the manufacture of HIPS and ABS resins.

DETAILED DESCRIPTION OF THE INVENTION

Feed stocks usually include one or more conjugated diolefin monomers. Typically, the feedstock is an admixture of the conjugated diolefin with other low molecular weight hydrocarbons. Such admixtures, termed low concentration diene streams, are obtained from a variety of refinery product streams, such as naptha-cracking operations.

Preferred diene monomers utilized in the preparation of the linear polydiene chains normally contain from 4 to 12 carbon atoms, with those containing from 4 to 8 carbon atoms being most commonly used. 1,3-butadiene and isoprene are the most common conjugated diolefin monomers used in this process. Additional monomers that can be utilized include 1,3-pentadiene, 2-methyl-1,3-pentadiene, 4-butyl-1,3-pentadiene, 1,3-hexadiene, 1,3-octadiene, 2,3-dimethyl-1,3-butadiene, piperylene, 2,3-dibutyl-1,3-pentadiene, 2-ethyl-1,3-pentadiene, 2-ethyl-1,3-butadiene, 3-butyl-1,3-octadiene, 2-phenyl-1,3-butadiene, styrene and the like, alone or in admixture. Some typical examples of low molecular weight hydrocarbons which may be admixed with the monomers in the polymerization feed include propane, propylene, isobutane, n-butane, 1-butene, isobutylene, trans-2-butene, cis-2-butene, vinylacetylene, cyclohexane, ethylene, propylene, hexane, heptane, octane and the like.

Polydiene rubbers which are copolymers or terpolymers of diolefin monomers with one or more other ethylenically unsaturated monomers can also be prepared from the process of this invention. Some representative examples of ethylenically unsaturated monomers that can potentially be synthesized into such polymers include vinylidene monomers; vinyl aromatics such as styrene, α-methylstyrene, bromostyrene, chlorostyrene, fluorostyrene and the like; α-olefins such as ethylene, propylene, 1-butene, and the like; vinyl halides, such as vinylbromide, chloroethane (vinylchloride), vinylfluoride, vinyliodide, 1,2-dibromethene, 1,1-dichloroethane (vinylidene chloride), 1,2-dichloroethane, and the like; vinyl esters, such as vinyl acetate; α,β-olefinically unsaturated nitriles, such as acrylonitrile anides, such as (meth)acrylamide, N-methyl acrylamide, N,N-dimethylacrylamide, methacrylamide and the like.

The polymerization of the present invention is normally carried out in a hydrocarbon solvent which can be one or more aromatic, paraffinic or cycloparaffinic compounds. The solvents normally contain from 4 to 10 carbon atoms per molecule and are liquids under the polymerization conditions. Some representative examples of potentially useful organic solvents include pentane, cyclohexane, normal hexane, benzene, toluene, xylene, ethyl benzene, and the like, alone or in admixture. In solution polymerizations which utilize the process of this invention, the polymerization medium normally can include 5 to 35 weight percent conjugated diolefin monomers. The polymerization medium preferably contain from 10 to 30 weight percent monomers, more preferably 20 to 25 weight percent monomers.

Accordingly, the polymerization medium includes an organic solvent, reactant monomers, and at least one initiator selected from organometallic compounds of the general formula $M(R)_x$ wherein M is Group I or Group II metal and R is an organic group described herein below. Organometallic initiators include the monofunctional and multifunctional types known for polymerizing the monomers described herein. Generally, utilization of a monofunctional organometallic initiator may be preferable. Preferred metals include lithium, potassium, sodium, zinc, magnesium, and aluminum. Of these, the organolithium initiators are particularly preferred.

The term "organolithium compounds", as employed herein, refers to organolithium compounds which correspond to the formula RLi, wherein R is a $C_1$–$C_{20}$ hydrocarbyl radical, preferably $C_3$–$C_6$, advantageously an aliphatic radical, but also may be $C_6$–$C_{20}$ cycloaliphatic or aromatic, preferably $C_6$–$C_{12}$. Preferred RLi compounds are n-butyl and sec-butyl lithium. Other suitable RLi compounds include but are not restricted to those in which the R groups are ethyl, n-propyl, isopropyl, n-arnyl, sec-amyl, sec-hexyl, n-hexyl, n-heptyl, octyl, nonyl, decyl, dodecyl, octadecyl, phenyl, tolyl, dimethyl/phenyl, ethylphenyl, naphthyl, cyclohexyl, methylcyclohexyl, ethylcyclohexyl, cycloheptyl, allyl, 2-butenyl, 2-methyl butenyl, cyclopentylmethyl, methycyclopentylethyl, pohenylethyl, cyclopentadienyl, naphthyl, penylcyclohexyl, and the like.

The amount of organometallic initiator utilized can vary with the monomers being polymerized and with the molecular weight desired for the resultant polymer. However, as a general rule, from 0.01 to 1 phm (parts per 100 pbw of monomer) of initiator will be utilized. In most cases, 0.025 to 0.07 phm of the organometallic initiator may be preferred.

The polymerization temperature can vary over a broad range from about −20° to 150° C. In most cases, a temperature within the range of about 30° to 120° C. can be useful. The pressure used will normally be sufficient to maintain the substantially liquid phase under the conditions of the polymerization reaction.

The polymerization reaction is generally conducted for a time sufficient to obtain a conversion of at least about 90% and preferably at least 99% conversion. More specifically, the polymerization is preferably carried out until at least 90% of the charged monomer has been polymerized. Accordingly, using 1,3 butadiene feedstock and the preferred range of initiator, the first stage of the process typically yields polybutadiene having a weight average molecular weight ($M_w$) in the range of about 70,000 to 250,000.

Thereafter, a coupling agent can be added to obtain the preferred mixture of linear and branched polydiene units. While many coupling agents are known in the art and may be applicable to the present invention, the multifunctional coupling agent preferably joins at least three polydiene chains. Representative examples of suitable coupling agents include multi-vinyl aromatic compounds, multi-epoxides, multi-isocyanates, multi-amines, multi-aldehydes, multi-ketones, multi-halides, multi-anhydrides, multi-esters and the like. Preferred coupling agents include multi-halides such as $SiCl_4$, $SiBr_4$, and $SiI_4$. In addition to these silicon multihalides, other metal multihalides, particularly, those from tin, lead, or germanium also can be readily employed as the coupling branching agent. Preferred among these are $SnCl_3$, hexachloraldisilane, methyl trichlorosilane, $CCl_4$, and trichloro methyl silane. The reaction can be terminated by any known method such as the addition of water, lower alcohols, etc.

Coupling agent can be added in a ratio of about 0.2 to 0.8 coupling equivalents to initiator equivalents. More preferably, the ratio can be about 0.3 to about 0.6 equivalents of coupling agent to organometallic initiator.

In this manner, the desired ratio of linear units to branched units can be achieved to provide a polybutadiene polymer having a solution viscosity in the range of 100 to 300 cP (0.10 to 0.30 kg/m.s) and Mooney viscosity in the range of 30 to 120 (ML4). A weight average $M_w$ of between about 150,000 and about 350,000, preferably from about 225,000 to about 275,000 can be obtained.

As recognized by the skilled artisan, a variety of modifications and/or additions to the basic process of this invention can be made without departing from the intention thereof. For example, various modifiers stabilizers and antioxidants may be employed.

To illustrate the instant invention, the following exemplary embodiment is provided. However, the embodiment is for the purpose of illustration only and the invention is not to be regarded as limited to the specific materials or conditions illustrated in the following examples.

The system was first flushed and dried. Into a first mixing tank were combined approximately 285 phm hexane, approximately 100 phm 1,3 butadiene, approximately 0.02 phm 1,2-butadiene, a titrating agent and vinyl modifier. This blended mixture was transferred to a second reaction tank and approximately 0.067 phm butyllithium catalyst was added. The reaction raised the temperature to approximately 200–220° F. (93.3–104.4° C.) and proceeded until approximately greater than 98% monomer conversion was completed. The resultant polybutadiene was transferred to a third mixing tank to which approximately 0.02 phm $SiCl_4$ was added ($SiCl_4$/Li=0.45Cl/Li; coupling agent to initiator equivalents). A stabilizer was added and the reaction terminated via the addition of water. The resultant product was dried and baled. The polybutadiene had a solution viscosity of about 170 cP (0.170, k/m.s), a Mooney viscosity of about 65 (ML4) and a $M_w$ of 260,000. Accordingly, mixed coupled and linear polybutadiene having the desired characteristics can be prepared via the inventive process.

While certain representative embodiments and details have been shown for purposes of illustrating the present invention, various modifications and changes to the process can be made without departing from the scope of the present invention.

What is claimed:

1. A polymer prepared by polymerizing at least one conjugated diene in the presence of an organometallic initiator comprised of an organic group and a Group I or Group II metal, to a conversion that is at least 90% complete and adding a coupling agent to produce a polymer comprised of branched and linear chains, said coupling agent being added at a ratio of about 0.3 to about 0.6 coupling agent equivalents to initiator equivalents, said polymer having a Mooney viscosity in the range of about 60 and 85 (ML4).

2. The polymer of claim 1 having a weight average molecular weight between about 225,000 and about 275,000.

3. The polymer of claim 1 having a solution viscosity in the range of about 150 to 190 cP (0.15 to 0.19 kg/m.s).

4. The polymer of claim 1 wherein said at least one conjugated diene monomer comprises 1,3-butadiene.

5. The polymer of claim 1 wherein said coupling agent comprises silicon tetrachloride.

6. The polymer of claim 1 wherein said organometallic initiator comprises n-butyl-lithium.

7. The polymer of claim 1 wherein from about 0.01 to 1.0 phm of organometallic initiator is used.

8. The polymer of claim 1 wherein said polymer has a weight average molecular weight between about 150,000 and about 350,000.

9. The polymer of claim 1 further including the addition of a vinyl modifier to said polymerization.

10. The polymer of claim 9 wherein said vinyl modifier comprising 1,2-butadiene.

* * * * *